United States Patent [19]

Watanabe et al.

[11] Patent Number: 4,932,338
[45] Date of Patent: Jun. 12, 1990

[54] APPARATUS FOR TRANSPLANTING SEEDINGS OF NURSERY PANS INTO BEDS

[75] Inventors: Shin Watanabe; Eiichiro Kinoshita; Tamaki Kubo, all of Iyo, Japan

[73] Assignee: Iseki & Co., Ltd., Matsuyama, Japan

[21] Appl. No.: 286,020

[22] Filed: Dec. 19, 1988

[30] Foreign Application Priority Data

Dec. 17, 1987 [JP] Japan .................................. 62-320247

[51] Int. Cl.$^5$ .......................... A01C 11/02; A01C 5/04
[52] U.S. Cl. ..................................... 111/105; 111/102; 111/115
[58] Field of Search ............... 111/100, 102, 104, 105, 111/109, 112, 113, 115

[56] References Cited

U.S. PATENT DOCUMENTS

| 1,972,325 | 9/1934 | Acasio | 111/100 |
| 4,788,920 | 12/1988 | Shaw | 111/105 |
| 4,854,802 | 8/1989 | de Groot | 111/105 |

FOREIGN PATENT DOCUMENTS

| 2432265 | 2/1980 | France | 111/105 |
| 596425 | 1/1984 | Japan | 111/105 |
| 145011 | 7/1985 | Japan | 111/105 |
| 895313 | 1/1982 | U.S.S.R. | 111/104 |
| 937300 | 9/1963 | United Kingdom | 111/104 |

Primary Examiner—Danton D. DeMille
Attorney, Agent, or Firm—Armstrong, Nikaido, Marmelstein, Kubovcik & Murray

[57] ABSTRACT

An apparatus for transplanting seedlings from a nursery pan to vegetable beds or flower beds as the case may be. The apparatus automatically takes up seedlings from the nursery pan individually pot by pot, and prior to implanting them, levelling a soil around the bed, digging holes in the bed to implant the seedlings therein, and compacting the soil around the root portions of the implanted seedlings.

1 Claim, 20 Drawing Sheets

APPARATUS FOR TRANSPLANTING SEEDINGS OF NURSERY PANS INTO BEDS

BACKGROUND AND SUMMARY OF THE INVENTION

The present invention relates to an apparatus for transplanting seedlings of a nursery pan into beds such as vegetable beds or flower beds.

To explain the background of the invention, reference will be made to FIG. 21:

FIG. 21 is a perspective view showing a known nursery pan. As shown in FIG. 21, the nursery pan 301 includes a number of cells or pots 301a just like a honeycomb. Each pot is provided with an aperture 301b in its bottom through which the young plant sprouts. The seen pan 301 is made of natural fibers or pulp which is easy to rot under the ground. Before seeding, the pots 301b are filled with a nursery soil or foaming urethane. Then the seed pan 301 is covered by a casing, wherein each aperture 301b is directed downward as shown in FIG. 21. When young plants grow to some extent in the pots 301a, they are manually transplanted to vegetable bed or flower beds. The manual transplantation consumes time and labor, which is not suitable for mass-transplantation of vegetables and flowers.

The present invention aims at solving the problems involved in the manual transplantation of seedlings. Thus an object of the present invention is to provide an apparatus for automatically transplanting seedlings in vegetable beds or flower beds, thereby saving time and labor in transplanting a number of seedlings in beds.

According to the present invention, there is provided an apparatus for transplanting seedlings of a nursery pan into vegetable beds or flower beds as the case may be, the apparatus automatically taking up seedlings from the nursery pan individually pot by pot, and prior to implanting them, levelling a soil around the bed, digging holes in the bed to implanting the seedlings therein, and compacting the soil around the root portions of the implanted seedlings.

Other objects and advantages of the present invention will become more apparent from the following detailed description, when taken in conjunction with the accompanying drawings which show, for the purpose of illustration only, one embodiment in accordance with the present invention.

BRIEF DESCRIPTION OF THE DRAWINGS

FIGS. 10(a), (b) and (c) are side views showing examples in which different seedlings are dealt with;

DETAILED DESCRIPTION OF THE INVENTION

Figure 1:
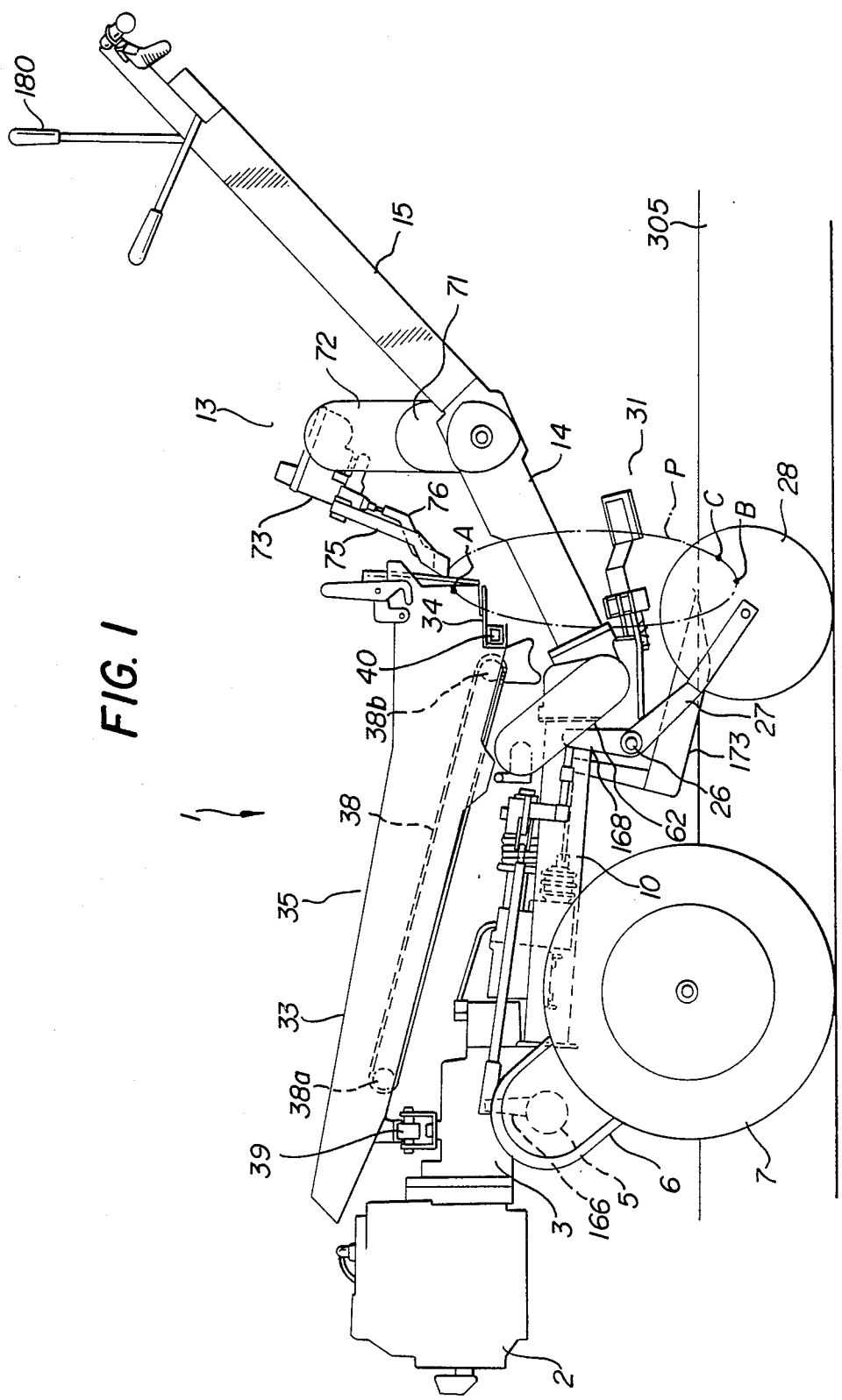
FIG. 1 is a side view showing an apparatus according to the present invention.
Figure 2:
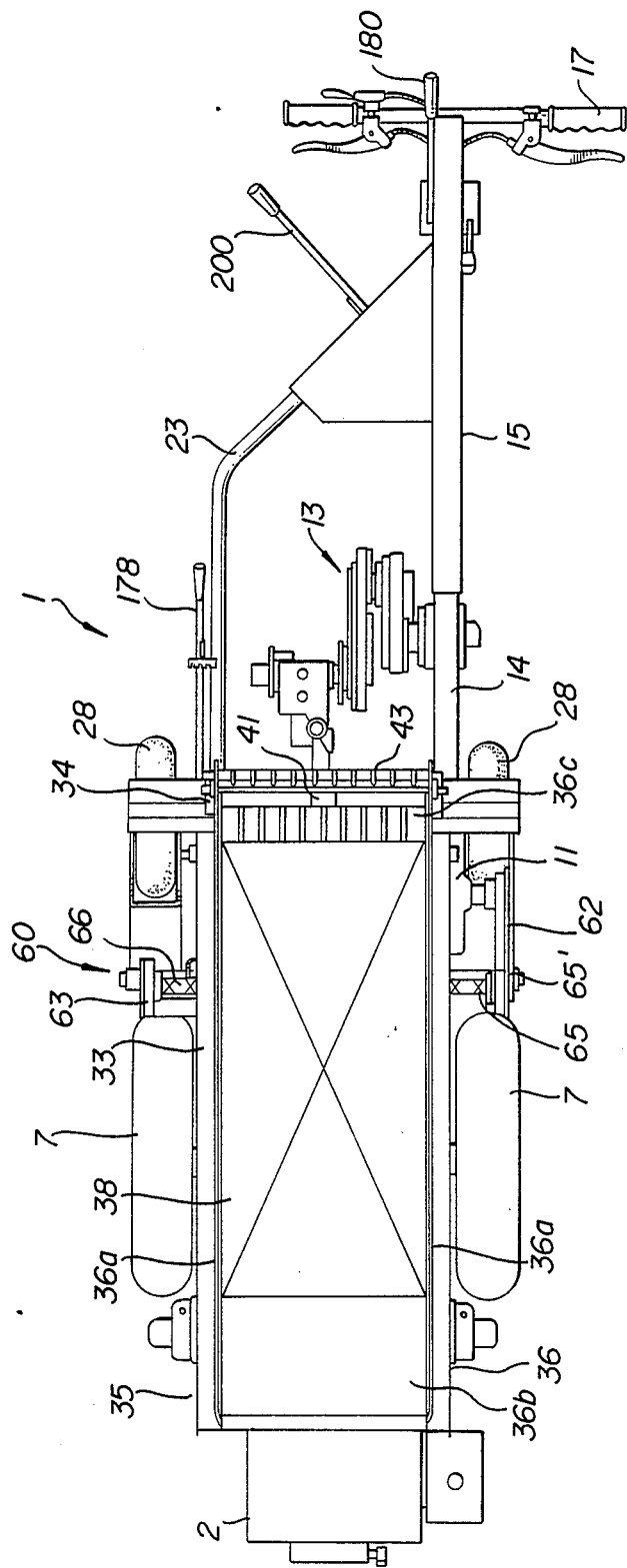
FIG. 2 is a plan view showing the apparatus of FIG. 1.

Referring to FIG. 1, an apparatus of the present invention, generally denoted by the reference numeral 1, includes an engine 2, a first transmission case 3, front wheels 7 connected to the transmission case 3 through cylinders 5 and cases 6. The pair of front wheels 7 are vertically moved by means of a lifting device, which will be hereinafter described.

Figure 3:
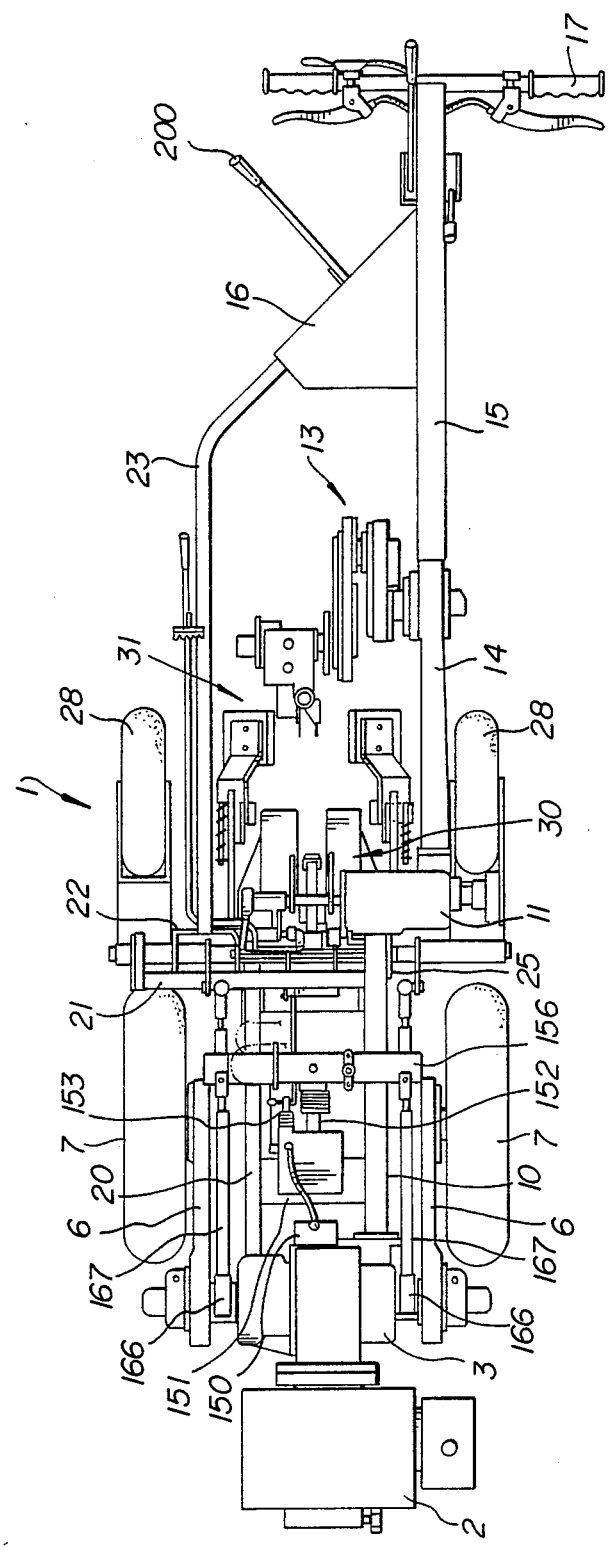
FIG. 3 is a plan view, partly omitted to show the internal structure, showing the apparatus of FIG. 1.

The transmission case 3 is connected to a first frame 10 housing a first driving shaft, and to a second transmission case 11, to which a second frame 14 housing a second driving shaft is connected. The reference numeral 17 denotes a steering handle secured to a panel 16 fixed to a handle supporting frame 15, which is pivotally connected to the second frame 14. An operating lever is also secured to the panel 16. There is provided another frame 20 in the opposite side of the first frame 10. Both frames 10 and 20 are connected to a transverse frame 21 whose one end projects at the right-hand side when viewed from the steering handle 17 as best shown in FIG. 3. The transverse frame 21 is provided with a C-shaped bracket 22, which is connected to the panel 16 by means of a reinforcing frame 23. In this way the transmission cases 3 and 11, and the frames 10, 14, 15, 20, 21, and 23 constitute a chassis of the apparatus 1.

Beneath the transverse frame 21 is a further bracket 25 secured to C-shaped bracket 22 and the second transmission case 11. The bracket 25 carries a shaft 26 to which arms 27 are rotatively connected to support a pair of rear wheels 28. The rear wheels 28 are also vertically movable in association with the front wheels 7. The bracket 25 also carries a digging device 30 and an earth covering section 31, both of which will hereinafter be described in detail.

Figure 21:
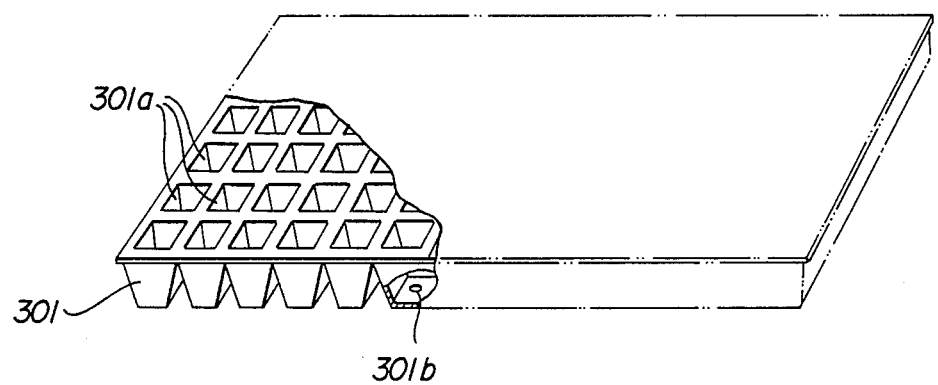
FIG. 21 is a schematic view explaining a nursery pan in common use.

There is provided a seedlings container 35 on top of the chassis, which includes a first frame 33 and a second frame 34. The container 35 is slightly raised toward the front of the chassis as best shown in FIG. 1. The first frame 33 occupies the majority of the container 35, and constitutes a framework 36 together with side plates 36a, a forward bottom plates 36b, and a backward bottom plate 36c. There is a space between the forward bottom plate 36b and the backward bottom plate 36c, and the space accommodates a belt 38 carried on a pair of rollers 38a and 38b such that the belt 38 is maintained flush with the both bottom plates 36b and 36c. Seedlings 300 are placed in a nursery pan 301 shown in FIG. 21. The bottom plate 36c is provided with a wavy surface, wherein the pitch between the adjacent waves correspond to the width of each pot 301a. The first frame 33 is movably supported by rails 39 and 40. The second frame 34 is integral with the rail 40, and maintained flush with the bottom plate 36c. The reference numeral 41 denotes a port through which seedings are taken out. The port 41 is provided with a plate 42 which is optionally withdrawn or extended depending upon whether it is to support the nursery pan 301 or not.

Figure 8:
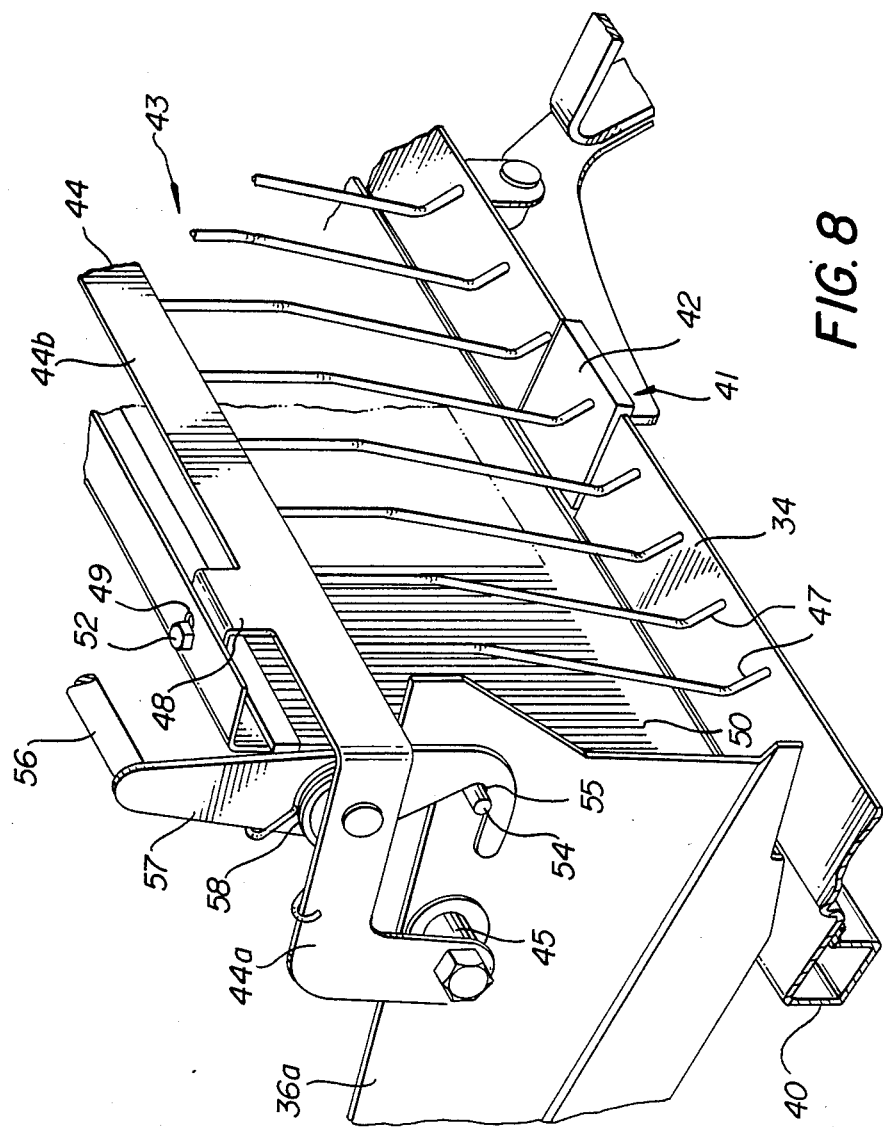
FIG. 8 is a perspective view showing a rear portion of a container in which seedlings are placed in readiness for transplanting.
Figure 9:
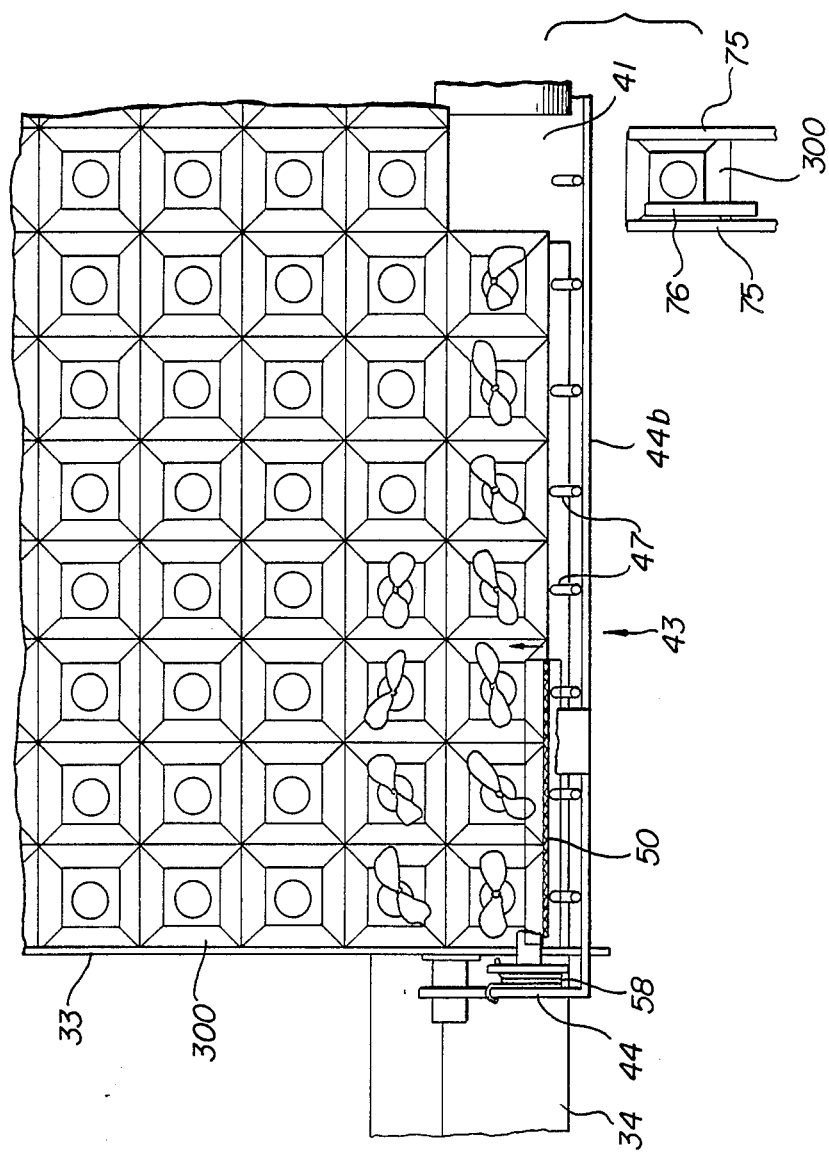
FIG. 9 is a plan view of the rear portion of the container.

The reference numeral 43 denotes a retainer for preventing the seedlings placed on the second frame 34 from dropping. As shown in FIG. 8, the retainer 43 includes a bracket 44 having a first portion 44a and a second portion 44b which are bent like the letter L, the bracket 44 being pivotally connected to the side plates 36a of the first frame by pins 45, and a plurality of pins 47 suspended from the bracket 44 at intervals corresponding to the width of each pot 301a. The suspended pins 47 are preferably made of piano wire. The free ends of the suspended pins 47 are outwardly bent. The second portion 44b of the bracket 44 includes a brush holder 48 for maintaining a bristle brush 50 by means of bolts 52 anchored in lengthwise holes 49. The brush 50 is to protect the young plants 300 from becoming damaged by pawls 75. There is a space between the suspended pins 47 and the brush 50, and the size of the space is adjusted by determining the anchoring position of the bolt 52 in the lengthwise hole 49. The bracket 44 is connected to a pair of rotary members 57 at opposite sides, which are connected to each other by means of a rod 56. Each rotary member 57 is provided with a hook portion 55, which is normally engaged with a projection 54 erected on the side plate 36a. The reference numeral 58 denotes a spring interposed between the bracket 44 and the rotary member 57. Owing to the action of the springs 58, the hook portion of the rotary members k57 are normally engaged with the projections 54. Thus the rear end of the first frame 33 is closed by the brush 50 and the suspended pins 47.

Figure 5:
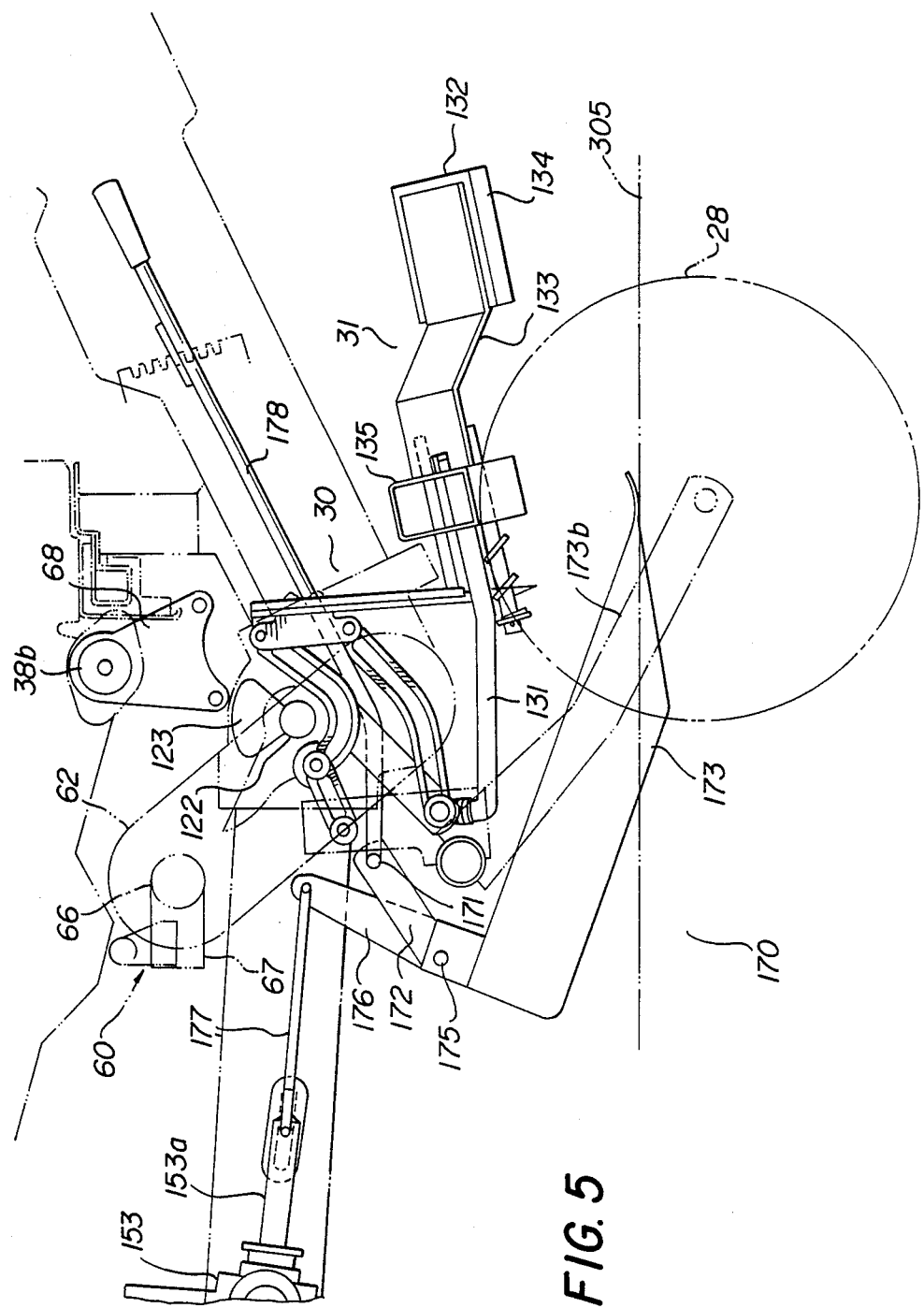
FIG. 5 is a side view showing a part of the apparatus of FIG. 1.

Referring to FIG. 5, a shifting section 60 for moving the container 35 crosswise will be described:

There is provided a lead cam shaft 66 having right-handed and left-handed lead screws 65 and 65' on its outer surface, respectively, the lead cam shaft 66 being disposed between the top end of a case 62 and a bearing 63 provided at an end of the projection of the transverse frame 21. To mate with the lead screws 65, 65', there is provided a lead metal 67 secured to the first frame 33, which metal 67 is provided with a pawl engageable with the lead screws 65, 65'. When the lead cam 66 rotates, the first frame 33 is moved to and fro through the lead metal 67 slidably fitted on the lead cam 66. During the reciprocal movement of the first frame 33 seedlings in the last row on the second frame 34 are shifted one by one to a seedling outlet 41. When the first frame 33 reaches either end of the stroke, a ratchet lever 68 secured to an end of a driving roller 38a is rotated by a cam 69 secured to a cam fixing shaft 122. thereby enabling a belt 38 to feed seedlings rearward by a row.

Figure 10A:
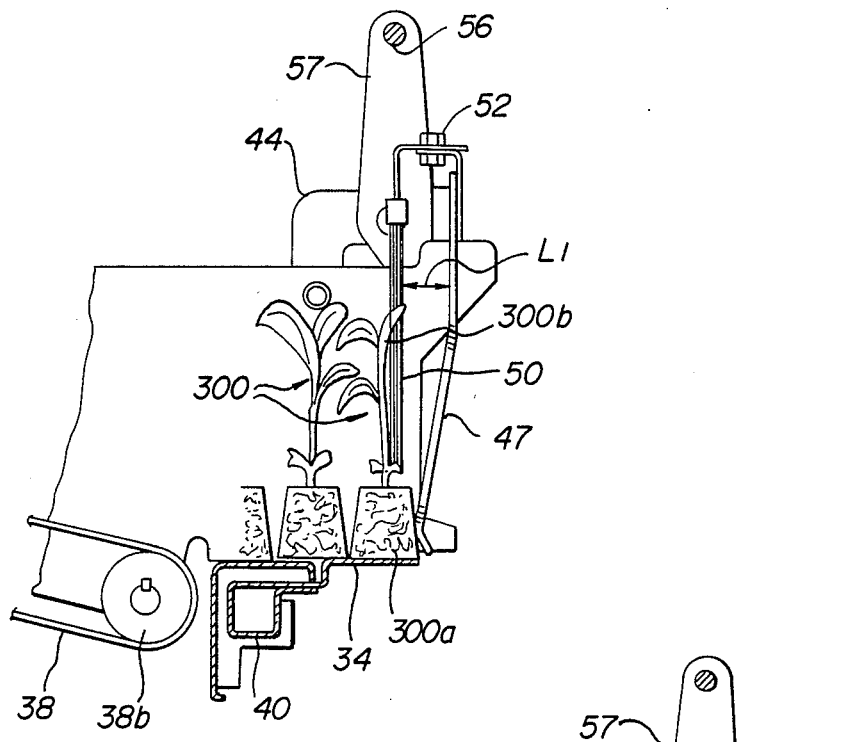
Figure 10B:
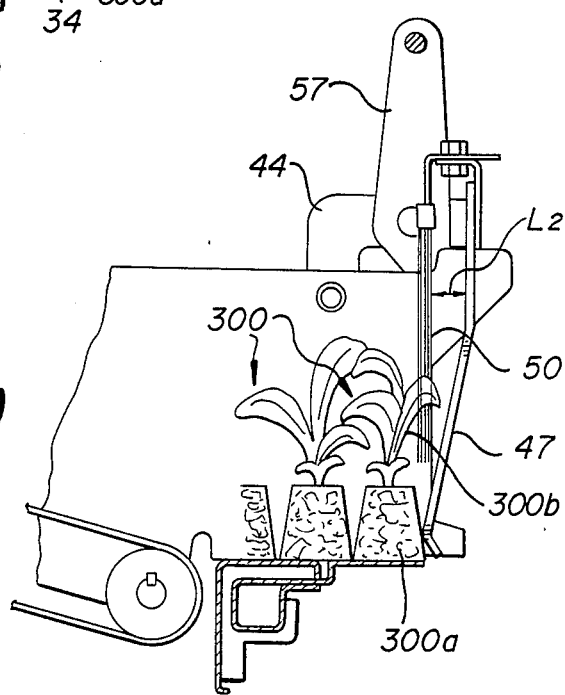

The seedlings 300 in the last row are retained by the retainer 43 with their root portions 300a being retained by the lower portions of the suspended pins 47 and with their leaves being softly received by the brush 50. The distance (L) between the suspended pins 47 and the brush 50 is large sufficiently to accommodate the seedlings having growing leaves. The position of the brush 50 is adjusted depending upon the size of the seedlings. FIG. 10(a) shows one example in which the distance ($L_1$) is relatively large so as to accommodate an upwardly bulky vegetable such as cabbage, and FIG. 10(b) shows another example in which the distance ($L_2$) is narrow so as to accommodate a laterally bulky vegetable such as a Chinese cabbage. In these examples $L_1 > L_2$. In this way the distance (L) can be adjusted depending upon the size and kind of the seedlings.

Figure 10C:
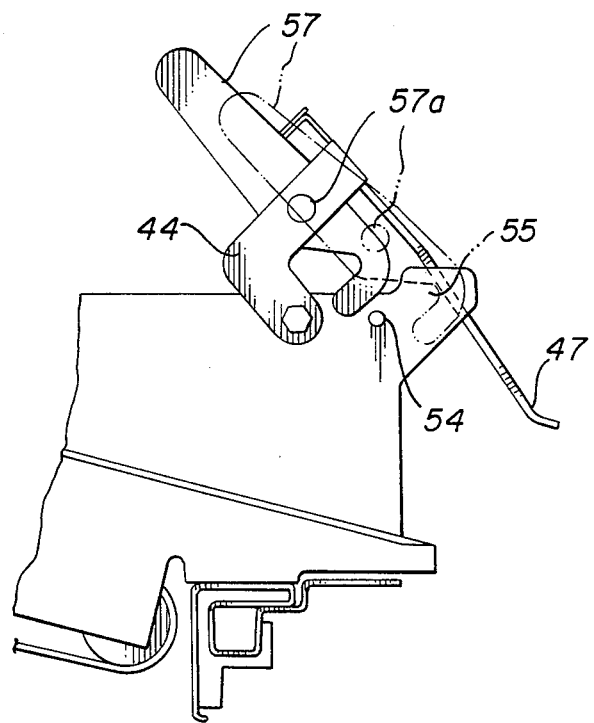

FIG. 10(c) shows a state where the retainer 43 is made inoperative by releasing the hook potion 55 from the projection 54, thereby opening the rear end of the container 35. Malnutrient seedlings and broken pots are thrown away through the opened rear end of the container 35.

Figure 11:
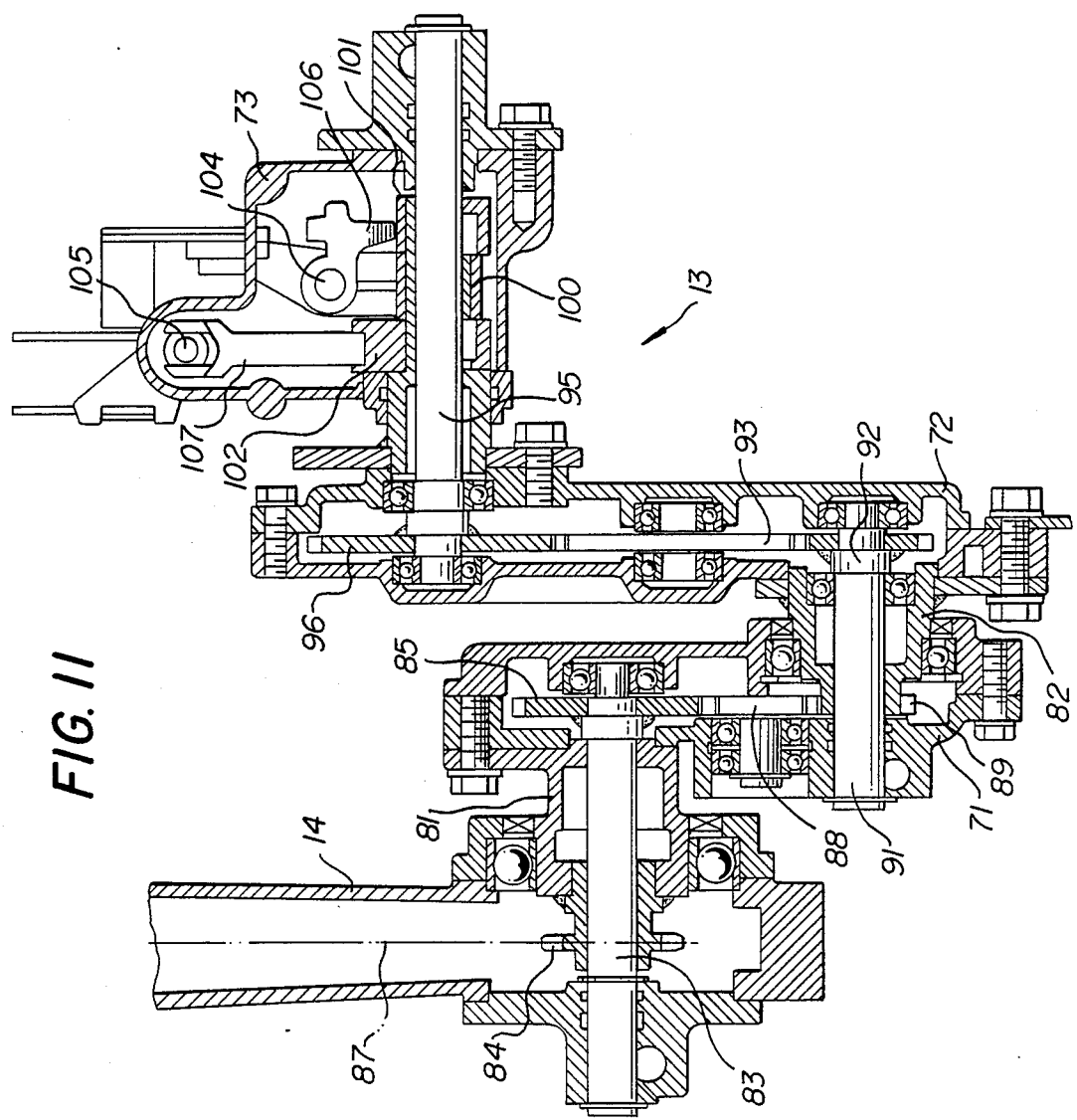
FIG. 11 is a cross-sectional view showing a transplanting section.
Figure 12:
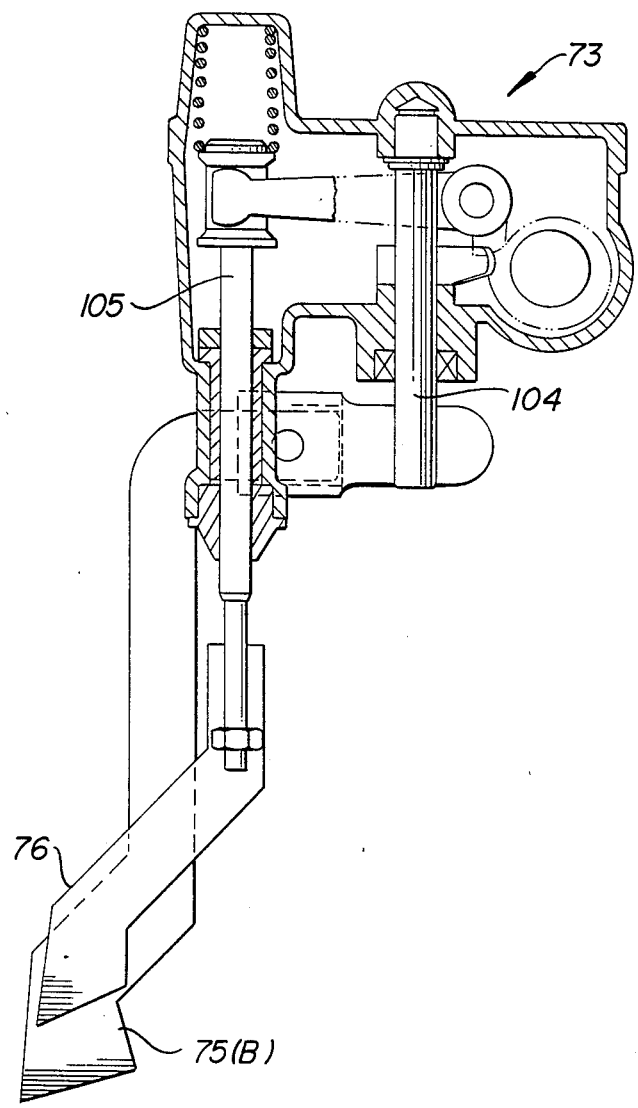
FIGS. 12 and 13 are cross-sectional views showing an implanting section.
Figure 13:
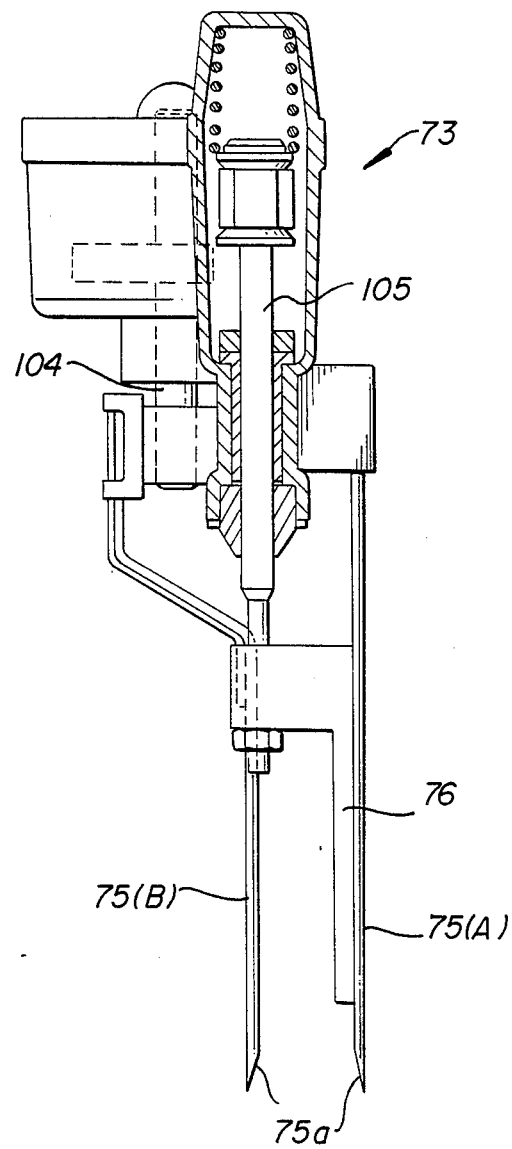

Referring to FIGS. 11 to 13, a transplanting section 13 will be described:

The section 13 includes a first rotary case 71, a second rotary case 72 and a third case 73 which includes a pair of pawls 75 and an extruder 76. The first rotary case 71 is integral with a rotary cylinder 18 rotatively fixed to the second frame 14, thereby enabling the case 71 to rotate with respect to the second frame 14. The second rotary case 72 is integral with a second rotary cylinder 82 rotatively fixed to the first rotary case 71, thereby enabling the case 72 to rotate with respect to the first rotary case 71. The second frame 14 is provided with a stationary shaft 83 whose end is firmly inserted in the first rotary case 71. There is a sprocket 84 engageable with the shaft 83, the sprocket being secured to the rotary cylinder 81. A gear 85 in the first rotary case 71 is secured to the shaft 83. The sprocket 84 carries a chain 87 housed in the second frame 14. A drive is imparted to the first rotary case 71 through the chain 87. The gear 85 meshes a gear 89 secured to the rotary cylinder 82 through a gear 88. In this way a train of gears are formed whereby when the first rotary case 71 rotates, the second rotary case 72 rotates in the opposite direction at a doubled speed. The first rotary case 71 also accommodates a second stationary shaft 91 whose end is accommodated in the second rotary case 72. A gear 92 secured to the second shaft 91 meshes a gear 96 secured to a shaft 95 through an intermediate gear 93, wherein the shaft 95 carries the third case 73 and is supported by the second rotary case 72. The gear ratios are predetermined such that the shaft 95 rotates relative to the second rotary case 72 but does not rotate relative to the apparatus 1.

The third case 73 is integrally supported by the shaft 95 whose end portion is inserted therein. There is provided a sleeve 100 secured to the second rotary case 72 to accommodate the shaft 95, the sleeve 100 including a first cam 101 and a second cam 102. The third case 73 includes a first shaft 104 and a second shaft 105 both perpendicular to the sleeve 100. the first shaft 104 includes a cam follower 106 forced to bias by the first cam 101, and the second shaft 105 includes a cam follower 107 forced to bias by the second cam 102.

The pair of pawls 75 consist of a stationary pawl 75(A) fixed to the third case 73 and a movable pawl 75(B) mounted on the first shaft 104. The two pawls 75(A) and 75(B) extend downward and have spatula-like top ends 75a, the extruder 76 is mounted on the second shaft 105 in such a manner as to keep contact with the inside of the stationary pawl 75(A).

The transplanting section 13 is operated as follows:

The first rotary case 71 rotates in a counter-clockwise direction (in FIG. 1) at a speed depending upon the speed of rotation of the front wheels 7, and the second rotary shaft 72 rotates in a clockwise direction at two times the speed of the first rotary case 71. In this way the third case 73 moves up and down along an elliptical track as shown in FIG. 1. Since the shaft 95 is arranged not to rotate relative to the apparatus 1, the third case 73, the pawls 75 and the extruder 76 maintain their postures. The ellipse (P) in FIG. 1 represents a track followed by the top ends of the pawls 75. At point (A), near the port 41, the extruder 76 engages the top surfaces of seedlings in one pot, and the movable pawls 75(B) close thereby to hold the seedling 300 in the pot. The seedling is maintained by the stationary pawls. At this stage the plate 42 is opened. At point (B), the lowest point of the track (P), the movable pawls (B) open, thereby implanting the seedlings into a vegetable beg or a flower bed, as the case may be. At point (C), slightly higher than the point (B), the extruder 76 starts to descend, thereby releasing the seedling from the pawls 75 (A) and (B) to allow the same to implant into a vegetable bed or a flower bed.

Figure 14:
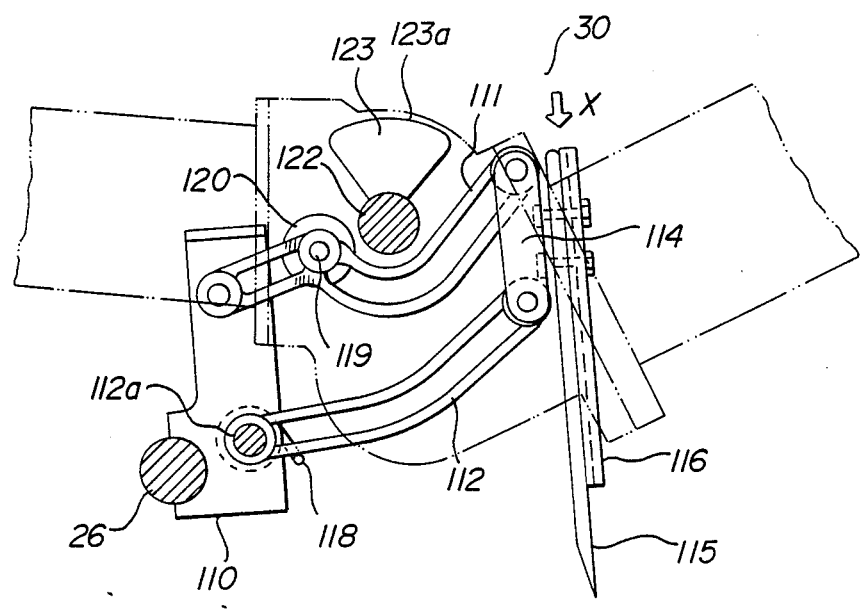
FIG. 14 is a schematic view showing a digging section.
Figure 15:
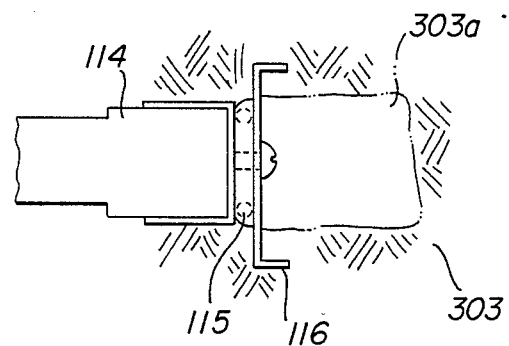
FIG. 15 is a schematic view on an enlarged scale showing the part indicated by the arrow in FIG. 14.

Referring to FIGS. 3, 5, 7, 14 and 15, the digging section 30 will be described:

The digging section 30 is to dig holes so as to implant the seedlings therein. The digging section 30 includes a gate-shaped frame 110 secured to the rear wheels supporting shaft 26, links 111 and 112 pivotally connected to the shaft 26, a connecting plate 114 connecting between the links 111 and 112, a needle 115 secured to the connecting plate 114 and an auxiliary plate 116, which is attached to the needle 115 such that its lower end is short of that of the needle 115 as shown in FIG. 14. The reference numerals 112a and 118 denote a pivot and a spring, respectively. The spring 118 forces the lower link 112 to face upward. The digging section 30 is driven by a sector cam 123 secured to a cam shaft 122 opposite to a cam follower 120. The cam shaft 122 extends from the second transmission case 11, and is supported by a bearing 124 at its end portion disposed behind the C-shaped bracket 22.

When the cam shaft 122 rotates, the sector cam 123 rotates, in the course of which it comes into engagement with the cam follower 120, thereby forcing the upper link 111 down. In this way the needle 115 and the auxiliary plate 116 are caused to descend. When the sector cam 123 separates from the cam follower 120, the needle 115 and the auxiliary plate 116 are caused to ascend under the action of the spring 118. The sector cam 123 has a flat cam surface 123a over which the needle 115 and the auxiliary plate 116 stop at their lowest points for a moment. While the needle 115 and the auxiliary plate 116 are stuck in the earth, the apparatus 1 is driven, thereby enabling the needle 115 to excavate a ditch. The auxiliary plate 116 breaks soil lumps dug out by the needle 115 and levels the soil along the ditch. When the ground is covered by a film 303, the needle 115 breaks it and make a lengthwise opening 303a in the direction of its advancement. The soil is allotted to either side of the lengthwise opening 303a, thereby covering the edge portions of the opening 303a with soil. This prevent the edge portion of the film from touching the seedlings and obstructing the growth of them.

Figure 6:
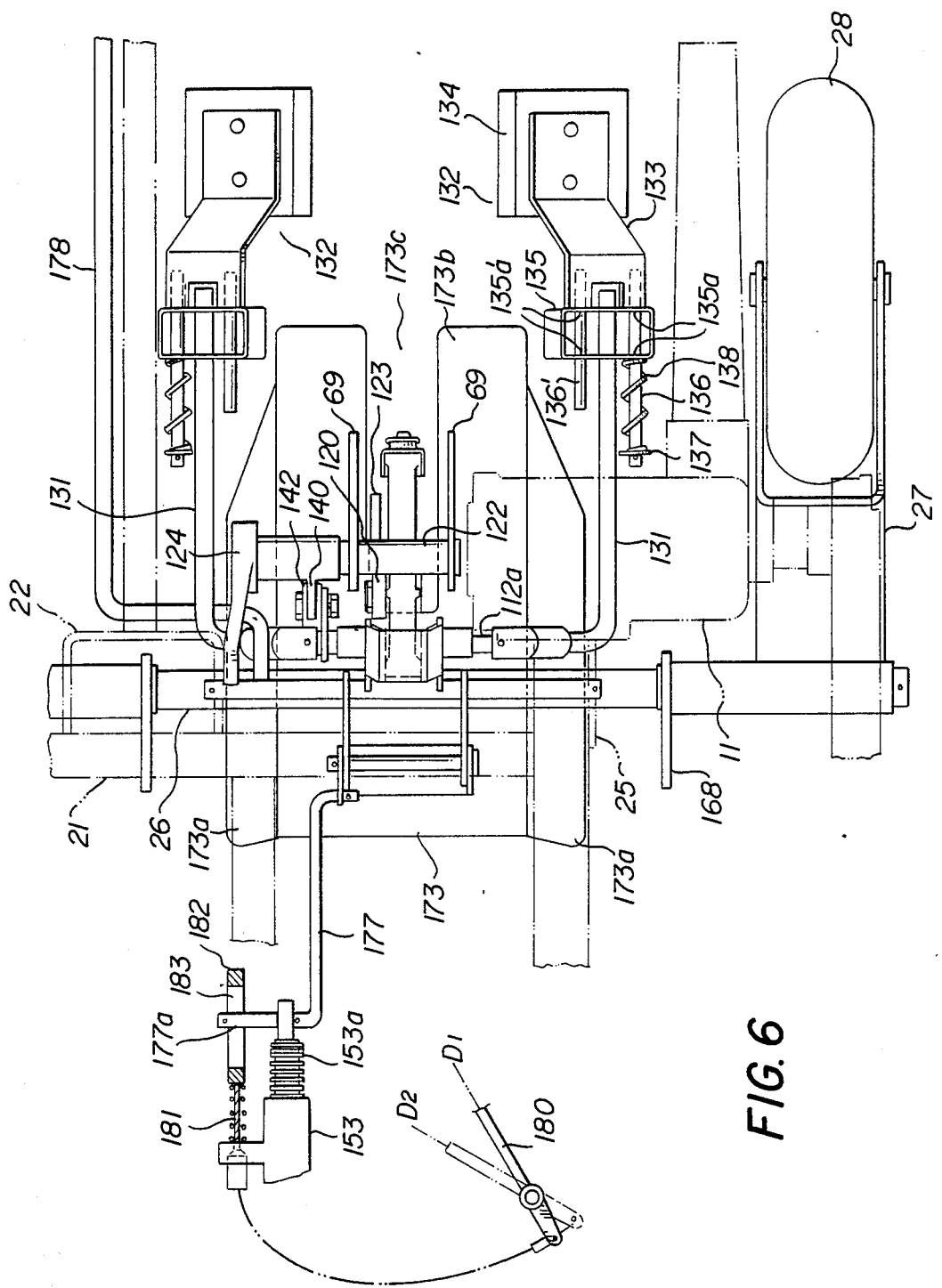
FIG. 6 is a plan view of the part shown in FIG. 5.

The earth covering section 31 will now be described:

This section 31 includes supporting rods 131 connected to the opposite ends of the pivots 112a through universal joints 130. The supporting rods 131 are provided with earth covering units 132 (FIGS. 5 and 6), which include pads 134 of plastics supported by supports 133. More specifically, each supporting rod 131 is provided with a fixture frame 135 having holes 135a and 135a', and sliding rods 136 and 135' are slidably inserted through the holes 135a and 135a'. The sliding rod 136 is provided with a spring 138 between the fixture frame 135 and an engaging plate 137. The spring 138 enables the earth covering unit 132 to move forward and backward in its tilted posture. The supporting rods 131 are driven by a cam 140 secured to the cam shaft 122 and a cam follower 142 secured to an arm 141 fixed to the pivot 112a.

Figure 7:
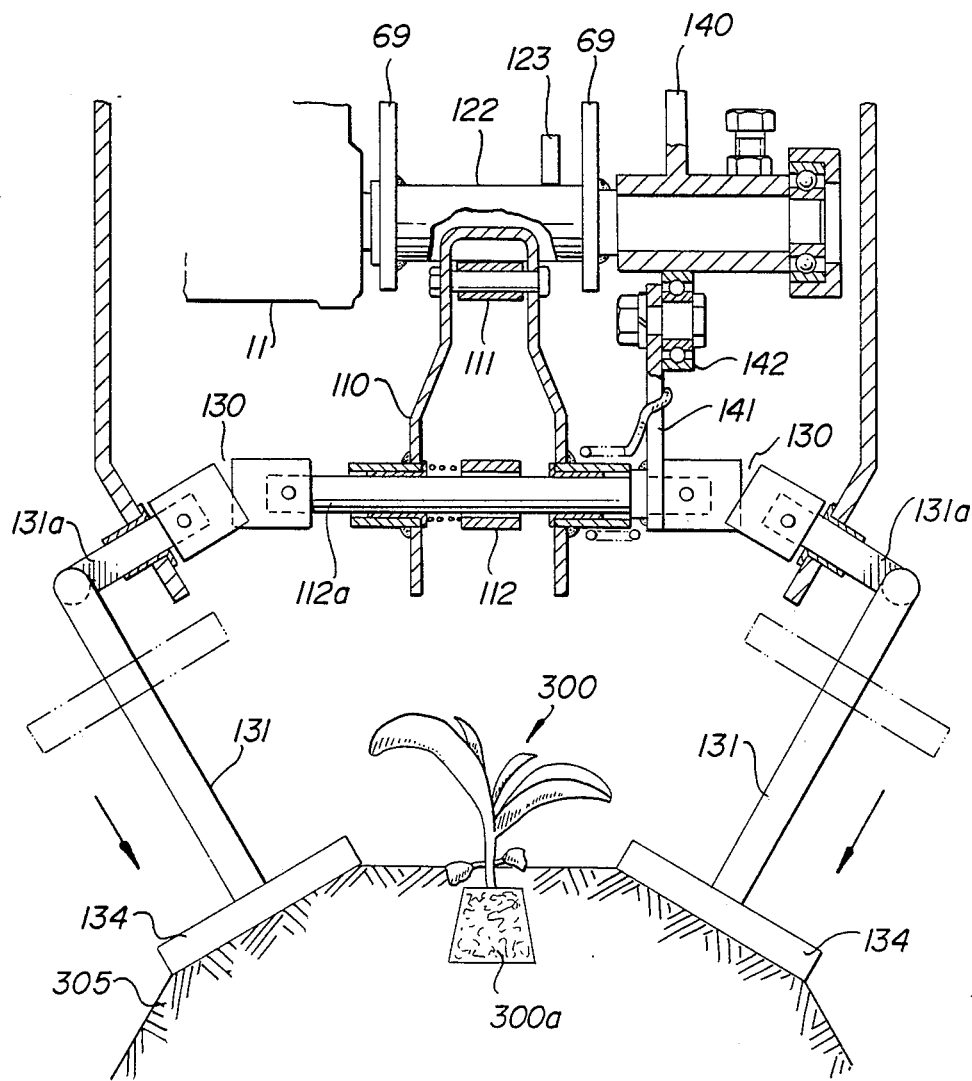
FIG. 7 is a rear view of the part shown in FIG. 5.

When the cam 140 rotates, the cam follower 142a is caused to descend periodically. The resulting rotation of the pivot 122a is transmitted to the supporting rods 131 through the universal joints 131. Since the root portions 131a of the supporting rods are inclined with respect to the pivots 112a, the pads 134 diagonally press the soil around the implanted seedlings as shown in FIG. 7. Some of the soil heaps up under the pressure provided by the pads 134, thereby enabling the soil to cover the root portions 300a of the seedlings.

As described above, the shifting section 60, the digging section 30 and the earth covering section 31 are driven by the cams 69, 123 and 140 carried on the common cam shaft 122, so that the driving mechanism is simplified with the minimum quantity of shafts and transmission means. It is also convenient to conduct the operations of these sections 60, 30 and 31 synchronously with the transplanting section 13. The cam shaft 122 is constituted by an extension of the main shaft of the second transmission case 11, Thereby eliminating the necessity of providing a cam driving mechanism.

Figure 16:
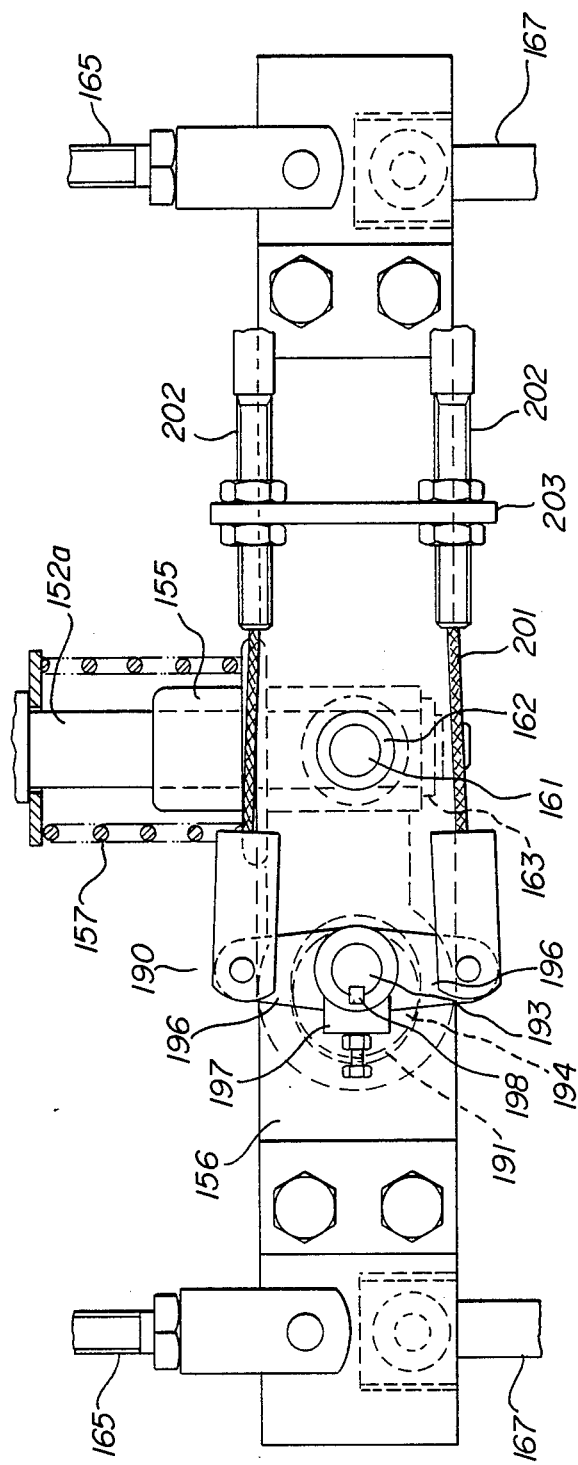
FIG. 16 is a plan view showing a balancer.
Figure 17:
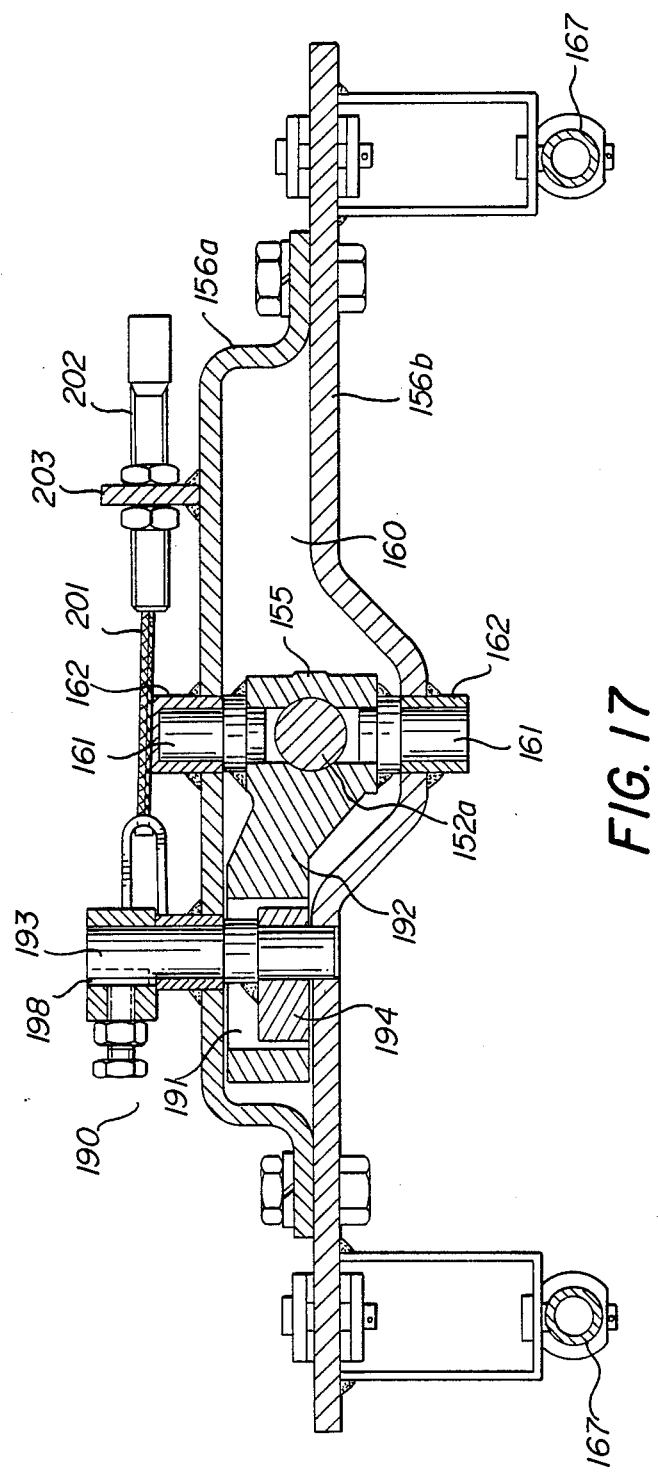
FIG. 17 is a rear view showing the balancer of FIG. 16.

The front wheels 7 and the rear wheels 28 are lifted by a hydraulic device, to which an oil is supplied by a pump 150 disposed in the rear section of the case 3. In addition, there are provided a hydraulic cylinder 152 and a valve 153 mounted on a support 151 disposed between the frame 10 and the side frame 20. The hydraulic cylinder 152 includes a piston 152a projecting rearward, whose rear end bears a slider 155 on which a balancer 156 is carried so as to be rotatable in a horizontal plane. The slider 155 is slidable axially of the piston 152a and is biased rearward by a spring 157 fitted to the piston 152a. The balancer 156 includes an upper plate 156a and a lower plate 156b, with the slider 155 inserted in a space 160 produced between the plates 156a and 156b. As shown in FIG. 16, the slider 155 includes pins 161 which are rotatively fitted in bosses 162 of the upper plate 156a and the lower plate 156b. In this way the slider 155 and the balancer 156 are connected to each other. The slider 155 is prevented from demounting from the unity by means of a stop 163 fitted in the top end of the piston 152a. The opposite ends of the balancer 156 are connected to arms 166 provided on the cylinders 5 by means of connecting rods 165 of the front wheels 7, and also connected to arms 168 provided on the rear wheel shaft 26 by means of connecting rods 167 of the rear wheels 28.

Figure 4:
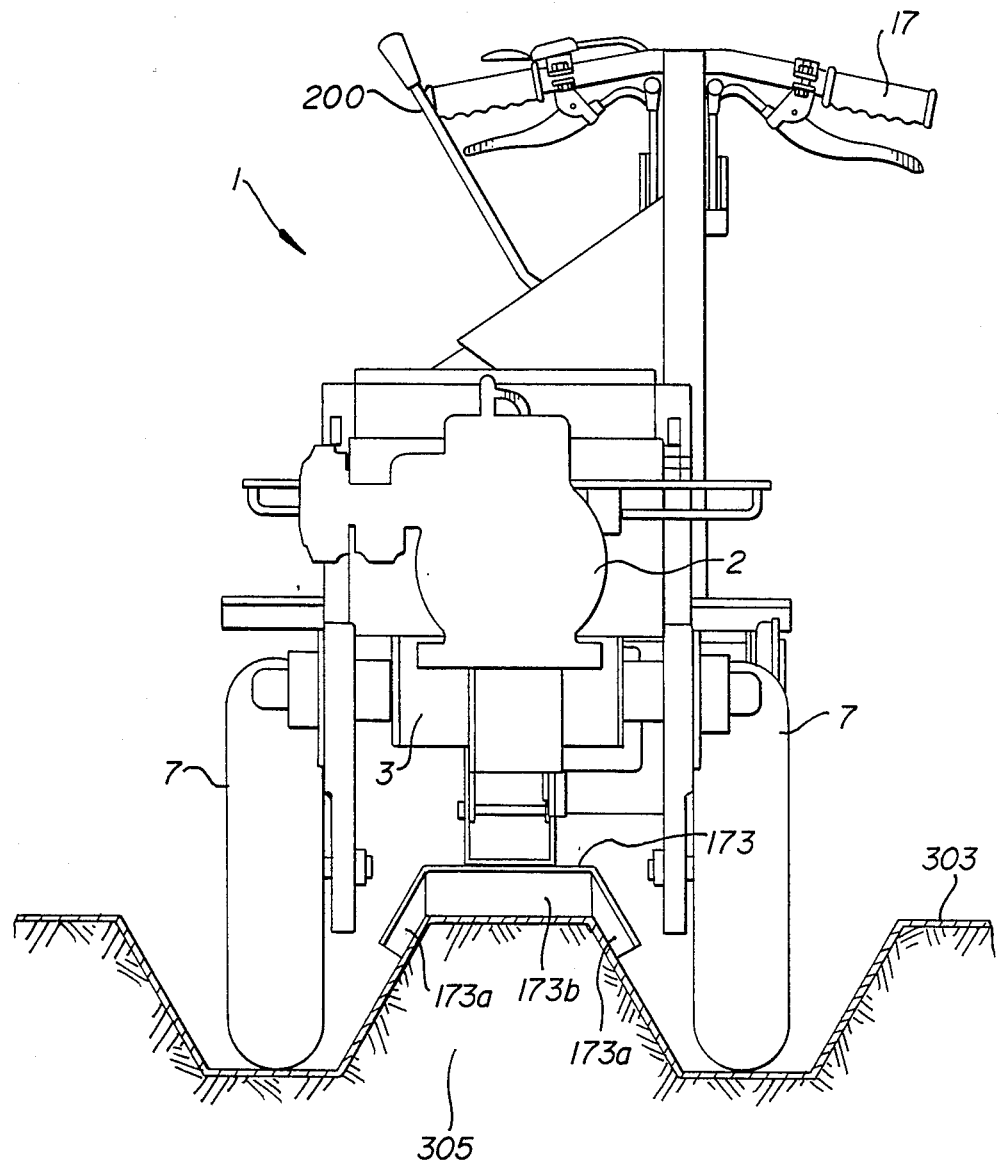
FIG. 4 is a front view of the apparatus of FIG. 1.
Figure 18:
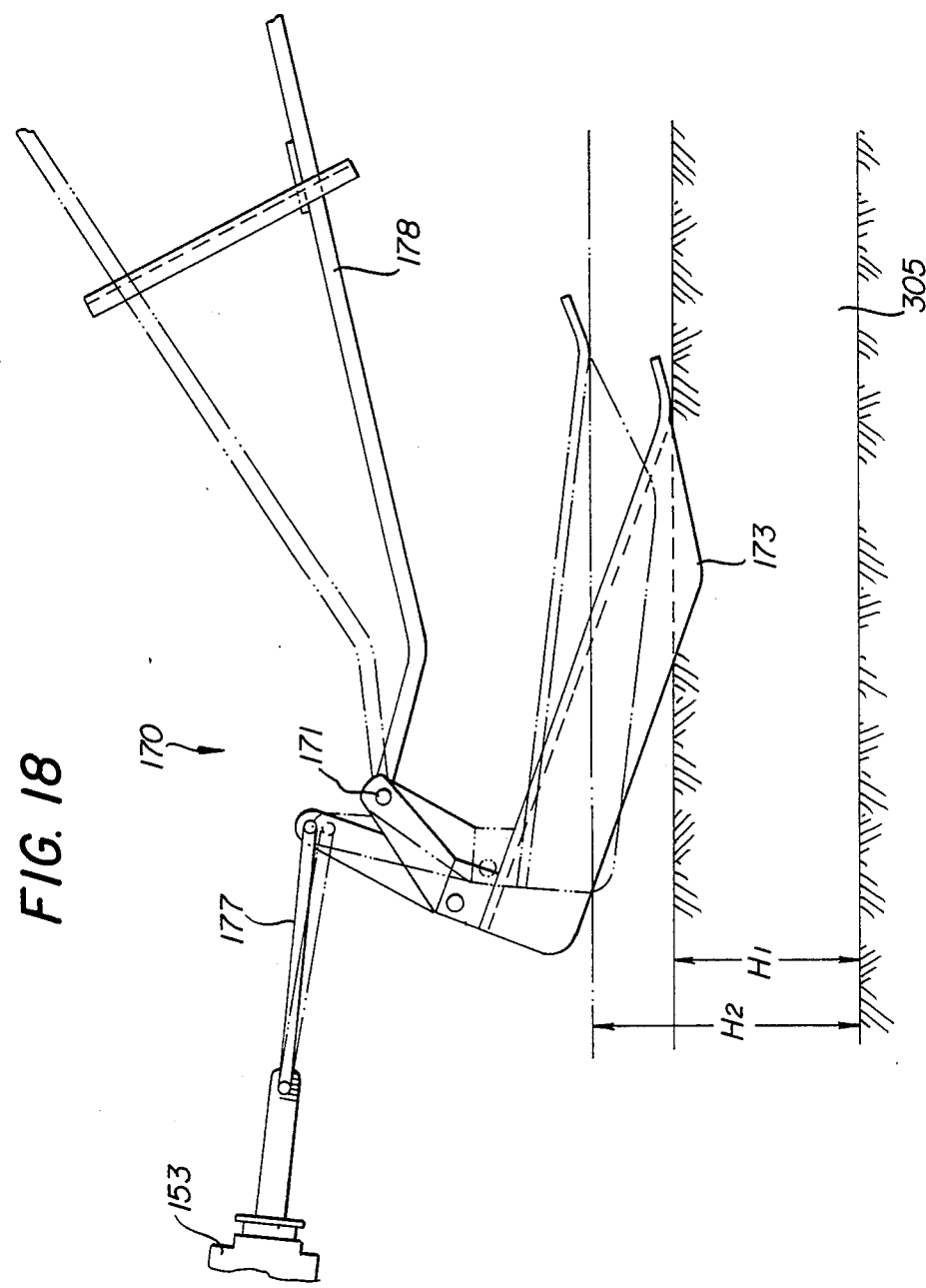
FIG. 18 is a schematic view explaining the structure and operation of the implanting section.
Figure 19:
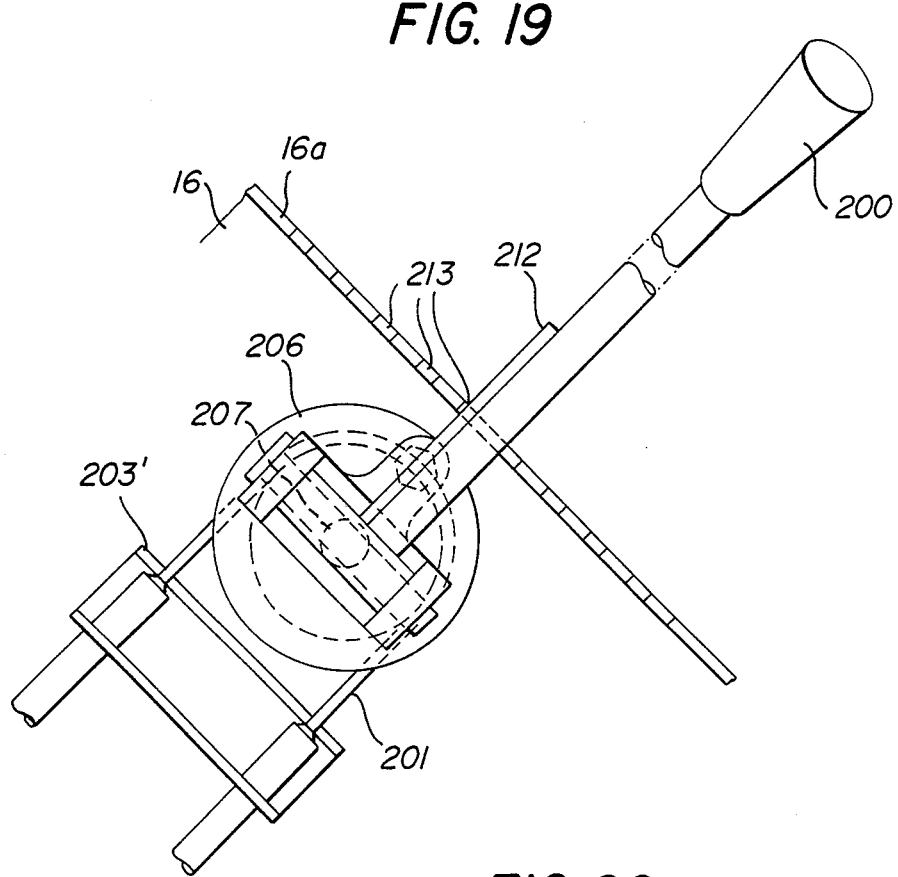
FIGS. 19 and 20 are schematic views explaining a device for controlling the level of the apparatus.
Figure 20:
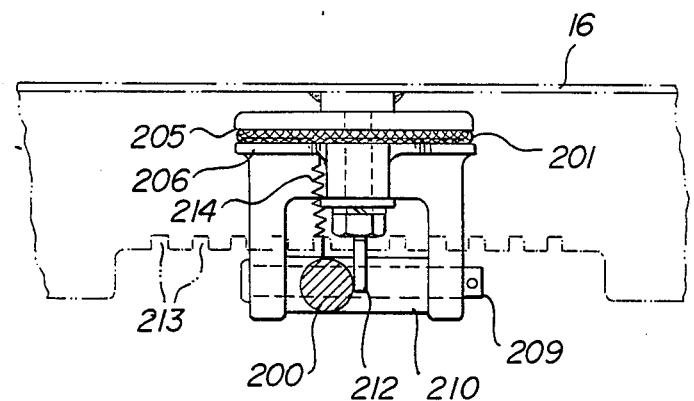

The hydraulic cylinder 152 for driving the lift is controlled by a controlling section 170 for defining the depth of implantation. In FIGS. 4, 5 and 18 the controlling section 170 includes an earth feeler 173 pivotally connected to a plate 172 by means of a pivot 175, the plate 172 extending from a rotary shaft 171 carried on the brackets 22. The earth feeler 173 includes an arm 176 which is connected to a valve spool 152a by means of a connecting rod 177. The earth feeler 173 also includes side portions 173b with a central portion 173a interposed therebetween, thereby surrounding a ridge with the portions 713a and 173b. The central portion 173a is provided with an opening 173c for allowing the pawls 75, the needle 115 and the auxiliary plate 116 to pass through.

In operation, the earth feeler 173 advances on the ground with its central portion 173a sliding on top of the ridge and its side portions sliding on the sides thereof. Any fluctuation of the earth feeler 173 due to the uneven surfaces of the ridge is transmitted to the hydraulic valve 153 through the spool 153a. In this regard the earth feeler functions as a sensor for detecting any variation in the height of a ridge. When the ridge is high, the earth feeler 173 is raised, thereby pushing the spool 153a into the valve 153. As a result, the hydraulic cylinder 152 is expanded, thereby moving the balancer 156 backward. Then the arms 156 and 158 rotate through the connecting rods 155 and 157 secured to the front wheels 7 and the rear wheels 28, respectively, thereby lowering these wheels 7 and 28 against the ground. As a result, the body of the apparatus 1 is raised. Likewise, when the ridge is low, and the earth feeler 173 descends, the body of the apparatus 1 is lowered. In this way the height of the apparatus is adjusted to conform to that of the ridges such that the seedlings are implanted at the same depth under the ground.

The desired depth for implantation is predetermined by adjusting the height of the earth feeler 173 by means of a lever 178. As shown in FIG. 18, when the lever 178 is lowered as indicated by the full line, the height ($H_1$) of the earth feeler 173 becomes low, thereby resulting in the shallow implantation. When the lever 178 is raised as indicated by the chain lines, the height ($H_2$) becomes high, thereby resulting in the deep implantation.

By adjusting the height of the earth feeler 173 by the lever 178, the elevation angle of the earth feeler 173 is varied, thereby varying the responsibility of the earth feeler for sensing the depth of implantation. More specifically, when the lever 178 is lowered so as to implant the seedlings shallow in ridges, the elevation angle of the earth feeler 173 becomes large, thereby increasing the responsibility thereof. Whereas, when the lever 178 is raised so as to implant the seedlings deep, the elevation angle of the earth feeler becomes small, thereby decreasing the responsibility thereof.

The connecting rod 177 has a hooked end portion 177a which is inserted in a lengthwise hole 183 produced in a switching member 182 connected to a lifting lever 180 by means of a wire 181, the lifting lever 180 being provided on the handle supporting frame 15. When the lifting lever 180 is at a point $D_1$ for automatic control, the end portion 177 is located in the center in the lengthwise hole 183, the spool 153a is free to pass in the valve 153, thereby effecting the automatic control. When the lifting lever 180 is at a point $D_2$, the end portion 177a is pulled by the side wall 183a of the lengthwise hole 183, the spool 153a is forced into the valve 153, thereby raising the body of the apparatus 1 to the desired height.

The space 160 accommodates a level controlling section 190. The slider 155 is provided with a cam receiver 192 having a elliptical hole 191, the cam receiver 192 extending sideways. The cam receiver 192 receives a disc-shaped cam 194 whose eccentric shaft 193 is secured to the elliptical hole 191. The eccentric shaft 193 is provided with an arm holder 197 having a pair of arms 196 keyed thereto by means of a key 198. The arms 196 are connected to the wires 201 secured to an operating lever 200 provided on the fixed panel 16. The wires 201 are covered with races 202 whose one ends are fixed to a bracket 203 erected on the upper plate 156a of the balancer 156.

The operating lever 200 will be now described in detail:

There is provided a disc 206 having a groove 205 for accepting the wire, the disc being rotatively connected to the fixed plate 16 by means of a shaft 207. The operating lever 200 is connected to a sleeve 210 pivotally connected to the disc 206 by means of a pivot 209. The wire 201 is wound in and along the groove 205 of the disc 206. The other ends of the wire races 202 are fixed to a plate 203' secured to the fixed plate 16. An engaging means 212 is provided at the root portion of the operating lever 200 such that the engaging means 212 is to fit in any of ditches 213 produced on the rim 16a of the fixed plate 16. The operating lever 200 is biased toward the ditches 213 by means of a spring 214.

By releasing the engaging means 212 from the ditch 213 the operating lever 200 is made free to operate in the direction of arrow, thereby enabling the wire 201 to move around the disc 206. In this way the arm holder 197 and accordingly, the cam 194 rotate, thereby rotating the balancer 156. If the balancer 158 rotates in a counter-clockwise direction in FIG. 3, the left-hand front wheel 7 an rear wheel 28 are raised with respect to the right-hand front wheel 7 and rear wheel 28, thereby tilting the apparatus 1 to the left. If the balancer 156 rotates in a clockwise direction, the apparatus tilts to the right.

As is evident from the foregoing, the apparatus of the present invention automatically levels the soil of beds, and transplants seedlings of the nursery pan into beds pot by pot. Finally the soil around the root portions of implanted seedlings is compacted to harden the soil around the root portions of the seedlings.

What is claimed is:

1. An apparatus for transplanting seedlings from a nursery pan to planting beds, the apparatus comprising:

a container for placing seedlings in readiness for transplanting, the container comprising a first frame movable with respect to the apparatus with seedlings placed thereon, said first frame reciprocally along the length of the apparatus, a second frame having a port through which the seedlings are taken out, a plurality of pins suspended from the second frame so as to retain the seedlings until they are discharged through the port, and a brush suspended from the second frame for protecting the seedlings retained by the pins against becoming damaged;

a transplanting means for planting seedlings taken out through the port into the beds, the transplanting means comprising a pair of pawls spaced from each other, and an extruder disposed between the pawls, the pawls and extruder being vertically movable such that the pawls hold the seedlings at the port and transfer the same to the bed and that the extruder separates the seedlings individually and is thrust into the earth to release the seedlings from the pawls;

an earth levelling means for levelling soil around the beds prior to planting the seedlings;

a digging means for digging holes in the soil levelled by the earth levelling means; and an earth covering means for covering the root portions of the planting seedlings with soil and compacting the soil to harden the root portions thereof.

* * * * *